US011929537B2

(12) United States Patent
Lyu et al.

(10) Patent No.: US 11,929,537 B2
(45) Date of Patent: Mar. 12, 2024

(54) RESONATOR FILTER

(71) Applicant: Kunshan Luxshare RF Technology Co., Ltd., Suzhou (CN)

(72) Inventors: ShanCe Lyu, Suzhou (CN); Ye Wang, Suzhou (CN); XingHua Sun, Suzhou (CN)

(73) Assignee: KUNSHAN LUXSHARE RF TECHNOLOGY CO., LTD., Suzhou (CN)

( * ) Notice: Subject to any disclaimer, the term of this patent is extended or adjusted under 35 U.S.C. 154(b) by 178 days.

(21) Appl. No.: 17/580,281

(22) Filed: Jan. 20, 2022

(65) Prior Publication Data

US 2022/0336937 A1 Oct. 20, 2022

(30) Foreign Application Priority Data

Apr. 16, 2021 (CN) ......................... 202120780490.7

(51) Int. Cl.
*H01P 1/20* (2006.01)
*H01P 7/00* (2006.01)

(52) U.S. Cl.
CPC . *H01P 1/20* (2013.01); *H01P 7/00* (2013.01)

(58) Field of Classification Search
CPC ............... H01P 1/20; H01P 7/00; H01P 1/205
See application file for complete search history.

(56) References Cited

U.S. PATENT DOCUMENTS

| | | | | |
|---|---|---|---|---|
| 9,467,116 | B2 * | 10/2016 | Subedi | H01P 1/2135 |
| 10,236,550 | B2 * | 3/2019 | Tamiazzo | H01P 1/2053 |

FOREIGN PATENT DOCUMENTS

| | | |
|---|---|---|
| CN | 107210505 A | 9/2017 |
| CN | 212209713 U | 12/2020 |

* cited by examiner

*Primary Examiner* — Andrea Lindgren Baltzell
*Assistant Examiner* — Kimberly E Glenn
(74) *Attorney, Agent, or Firm* — Birch, Stewart, Kolasch & Birch, LLP

(57) ABSTRACT

Disclosed is a resonant filter, which includes a housing including an input hole and an output hole, an input resonator including an input resonant body and an input port extending from the input resonant body and out of the housing through the input hole, and an output resonator including an output resonant body and an output port extending from the output resonant body and out of the housing through the output hole. The input resonator and the output resonator are fixed in the housing. The input resonator body and the output resonator body, which are sheets with a metal surface or metal sheets, respectively include a resonant rod with an upright segment, an extension segment extending from the upright segment and one end of which away from the extension segment is connected to the housing, and a first branch extending from the extension segment away from the upright segment.

19 Claims, 7 Drawing Sheets

120/130

119

RESONATOR FILTER

CROSS REFERENCE TO RELATED APPLICATION

This application claims the priority benefit of Chinese Patent Application Serial Number 202120780490.7, filed on Apr. 16, 2021, the full disclosure of which is incorporated herein by reference.

BACKGROUND

Technical Field

The present disclosure relates to the technical field of filter, particularly to a resonant filter.

Related Art

The cavity filter, which is used to select a frequency of a communication signal and filter out the noise or the interference signal other than the frequency of the communication signal, usually includes a cavity, a resonant rod, a cover plate and a tuning screw. The cover plate and the cavity form a resonant cavity, the resonant rod is set up at the bottom of the cavity and is in a cylindrical shape, and the cover plate cooperates with the tuning screw to adjust a coupling frequency of the cavity filter.

However, when the cavity filter is applied to an antenna filter unit (AFU), there are problems of difficulty in process realization and high cost due to the limitation of the miniaturization trend of products. In addition, because the cavity filter is limited by the frequency of the cylindrical resonator rod, there is a problem that it cannot be made smaller. Furthermore, the assembly relationship of the cavity filter is complicated, so that there is a problem that it is not conducive to production automation of the cavity filter.

In view of this, the development of a resonant filter that is small in size and easy to produce and assemble is an urgent problem to be solved by those skilled in the art.

SUMMARY

The embodiments of the present disclosure provide a resonant filter to effectively solve the problems of difficulty in process realization and high cost due to the miniaturization of the cavity filter, the problem that the cavity filter cannot be smaller due to the limitation of the frequency of the cylindrical resonant rod, and the problem of it is not conducive to production automation of the cavity filter due to the complicated assembly relationship of the cavity filter.

The present disclosure provides a resonant filter, comprising: a housing, an input resonator, and an output resonator. The housing includes an input hole and an output hole, and an accommodating cavity is provided in the housing. The input resonator is located in the accommodating cavity and fixed in the housing, and includes an input resonant body and an input port extending from the input resonant body. The input port extends out of the housing through the input hole. The output resonator is located in the accommodating cavity and fixed in the housing, and includes an output resonant body and an output port extending from the output resonant body. The output port extends out of the housing through the output hole. The input resonator and the output resonator are sheets with a metal surface or metal sheets. The input resonator body and the output resonator body respectively include a resonant rod, the resonant rod include an upright segment, an extension segment extending from one or both sides of the upright segment, and a first branch extending from the extension segment away from the upright segment, and an end of the upright segment away from the extension segment is connected to the housing.

In an embodiment, the resonant filter further comprises an isolation plate. The isolation plate is located in the accommodating cavity and separates the input resonator from the output resonator, and the isolation plate has at least one opening.

In an embodiment, the resonant filter further comprises an input device and an output device. The input device and the output device are respectively engaged with the input hole and the output hole of the housing. The input port passes through the input device and extends out of the housing. The output port passes through the output and extends out of the housing.

In an embodiment, the housing further comprises a bottom plate portion, a side wall portion, and a cover plate portion. The side wall portion is surroundingly connected to the bottom plate portion. The side wall portion and the bottom plate portion form the accommodating cavity and an opening, and one side surface of the cover plate portion covers and is fixed on the opening. The input resonant body and the output resonant body are fixedly disposed on the bottom plate portion, and the input hole and the output hole are provided on the bottom plate portion or the side wall portion.

In an embodiment, the number of the first branches is plural, and the first branches are spaced apart from each other and connected to the extension segment.

In an embodiment, the resonance rod further comprises a plurality of second branches, the second branches respectively extend from ends of the first branches away from the extension segment, and the first branches and the second branches extend along different axial directions.

In one embodiment, the plurality of second branches extend in the same direction, in directions towards each other, or in directions away from each other.

In an embodiment, the resonance rod further comprises a coupling segment connected between the first branch and the extension segment, and a width of the coupling segment is less than that of the first branch connected to the coupling segment.

In an embodiment, the number of the resonant rods of the input resonant body and the number of the resonant rods of the output resonant body are respectively plural, the input resonant body and the output resonant body further respectively comprise an engaging rod, and the engaging rod connects adjacent two of a plurality of the resonant rods.

In an embodiment, the housing further comprises a bottom plate portion and a cover plate portion, the bottom plate portion and the cover plate portion are disposed parallel to each other. The input resonance body and the output resonance body are fixed on the bottom plate portion, and the cover plate portion is provided with an adjusting tab and an isolation tab. A setting position of the adjusting tab corresponds to the upper side of the input resonant body or the upper side of the output resonant body, and a setting position of the isolation tab corresponds to the upper side between two adjacent resonant rods of the input resonant body or the upper side between two adjacent resonant rods of the output resonant body.

In the embodiments of the present disclosure, the resonator filter uses the input port of the input resonator to extend out of the housing through the input hole and uses the output port of the output resonator to extend out of the housing through the output hole, to realize the simple structure of the input port and the output port of the resonator filter. By the design of the input resonator and the output resonator as sheets with a metal surface or metal sheets, the resonant filter can realize capacitive coupling without a physical capacitive structure, thereby realizing the low-end transmission zero point. By the overall structural design, the resonance filter is small, the structure of the resonance filter is simple, and it is easy to realize the miniaturization process of the resonant filter, and it is conductive to the automated production of the resonant filter.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
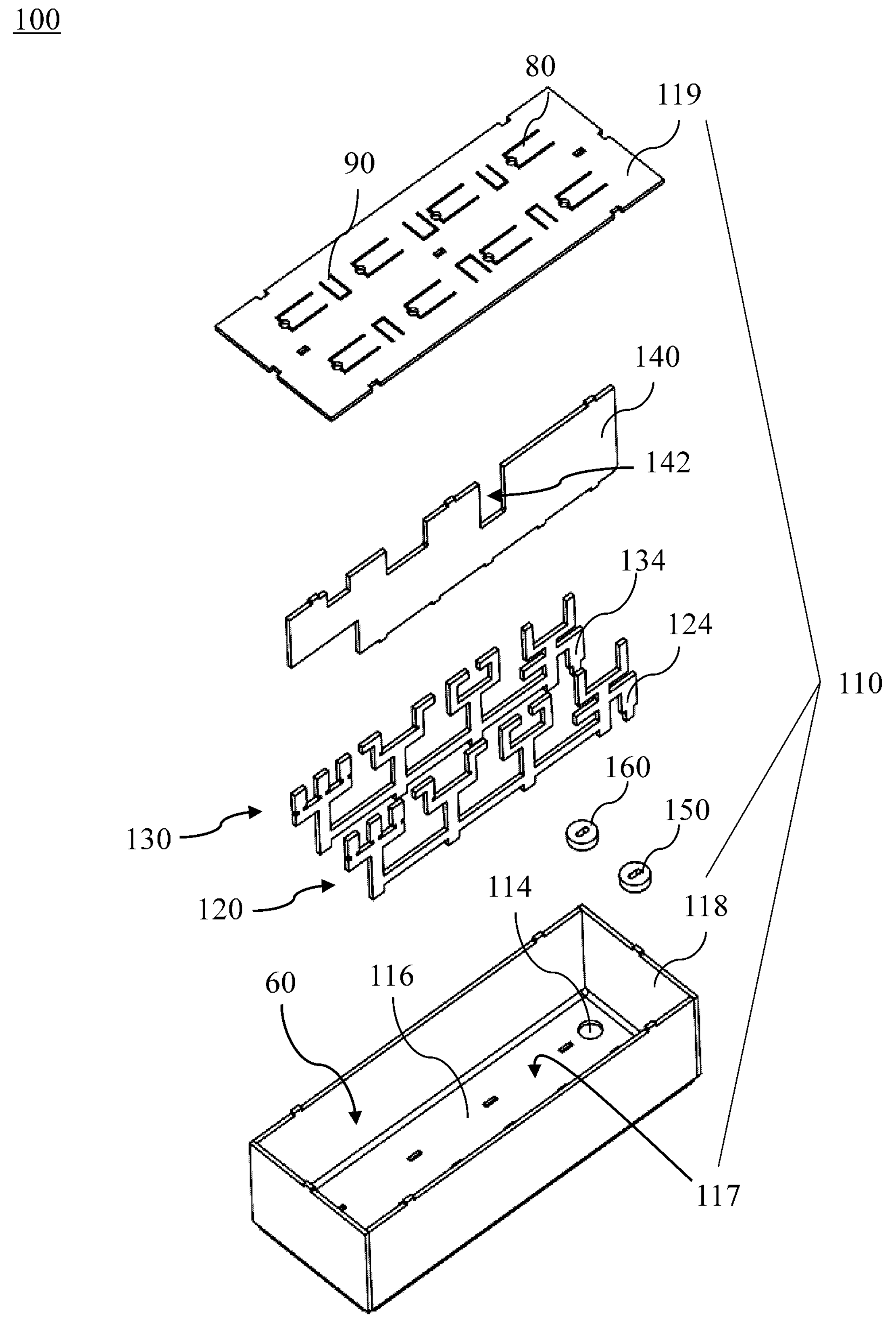
FIG. 1 is an exploded view of a resonant filter according to an embodiment of the present application.

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

In the following embodiment, the same reference numerals are used to refer to the same or similar elements throughout the disclosure.

Figure 2:
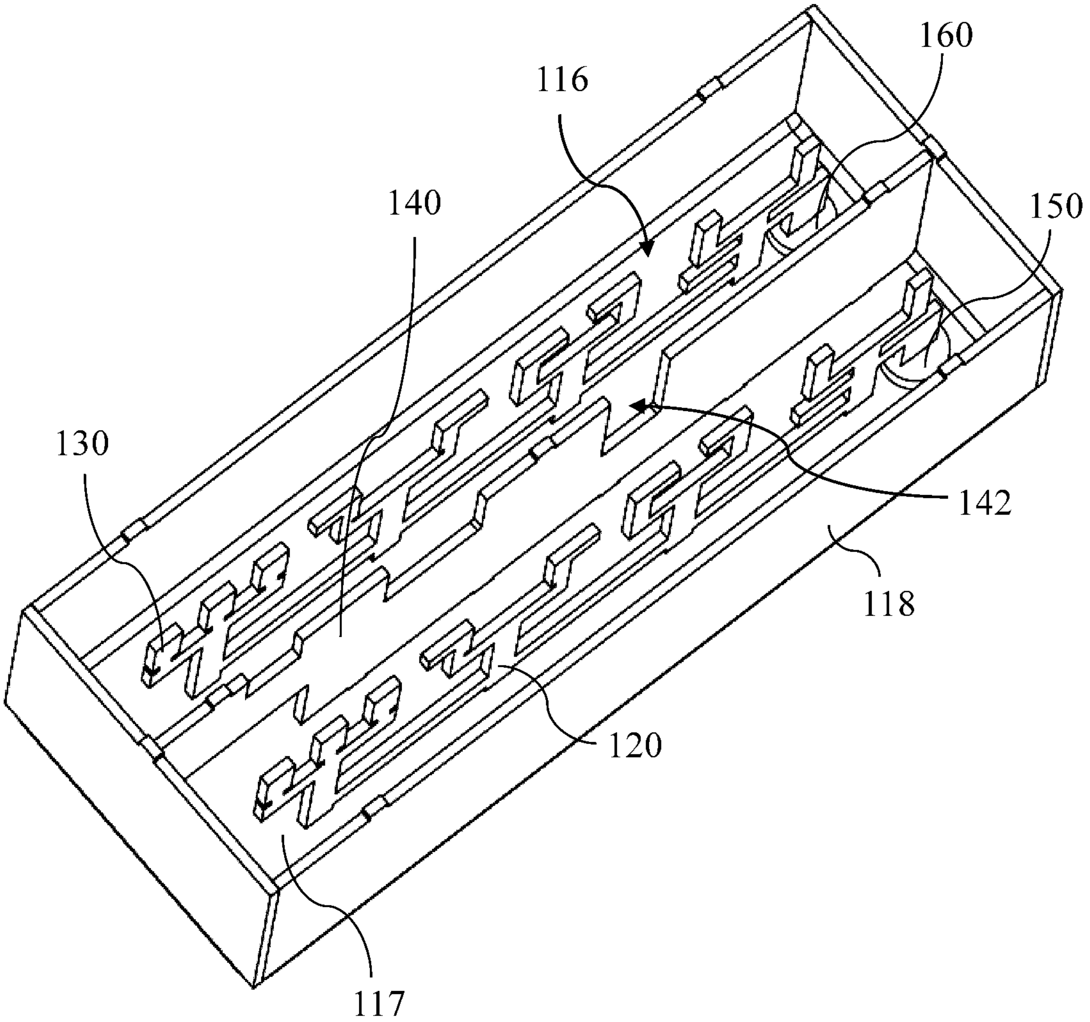
FIG. 2 is a combined diagram of an embodiment of the resonant filter of FIG. 1.
Figure 3:
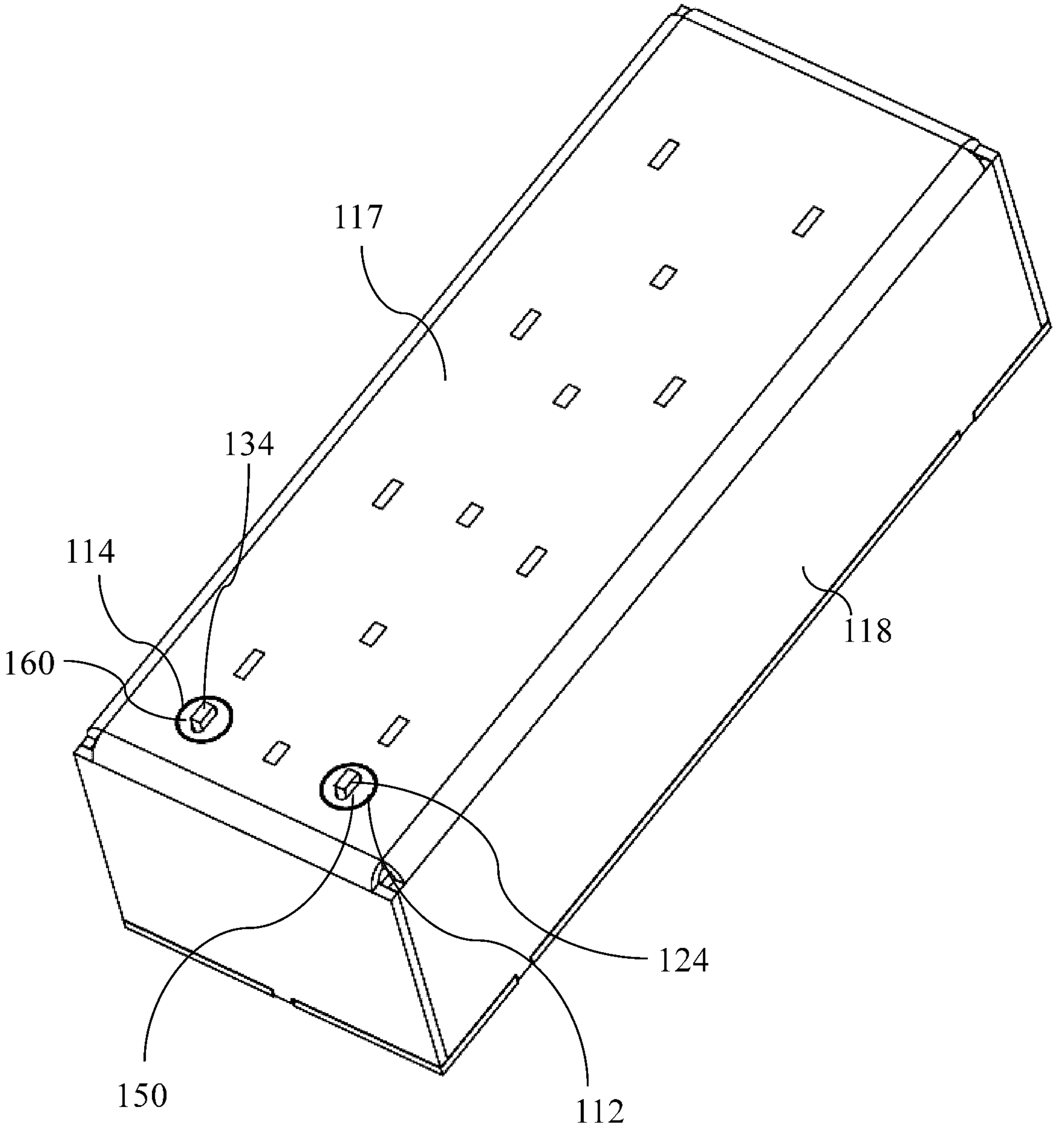
FIG. 3 is a schematic structural diagram of an embodiment of the resonant filter of FIG. 1.

Please refer to FIG. 1 to FIG. 3. FIG. 1 is an exploded view of a resonant filter according to an embodiment of the present application, FIG. 2 is a combined diagram of an embodiment of the resonant filter of FIG. 1, and FIG. 3 is a schematic structural diagram of an embodiment of the resonant filter of FIG. 1. It should be noted that, in order to show the internal combination of a housing 110 of a resonant filter 100, a cover plate portion 119 of the housing 110 is omitted in FIG. 2. As shown in FIG. 1 to FIG. 3, in this embodiment, the resonant filter 100 includes the housing 110, an input resonator 120, and an output resonator 130. The housing 110 includes an input hole 112 and an output hole 114, and an accommodating cavity 116 is provided in the housing 110.

Figure 4:
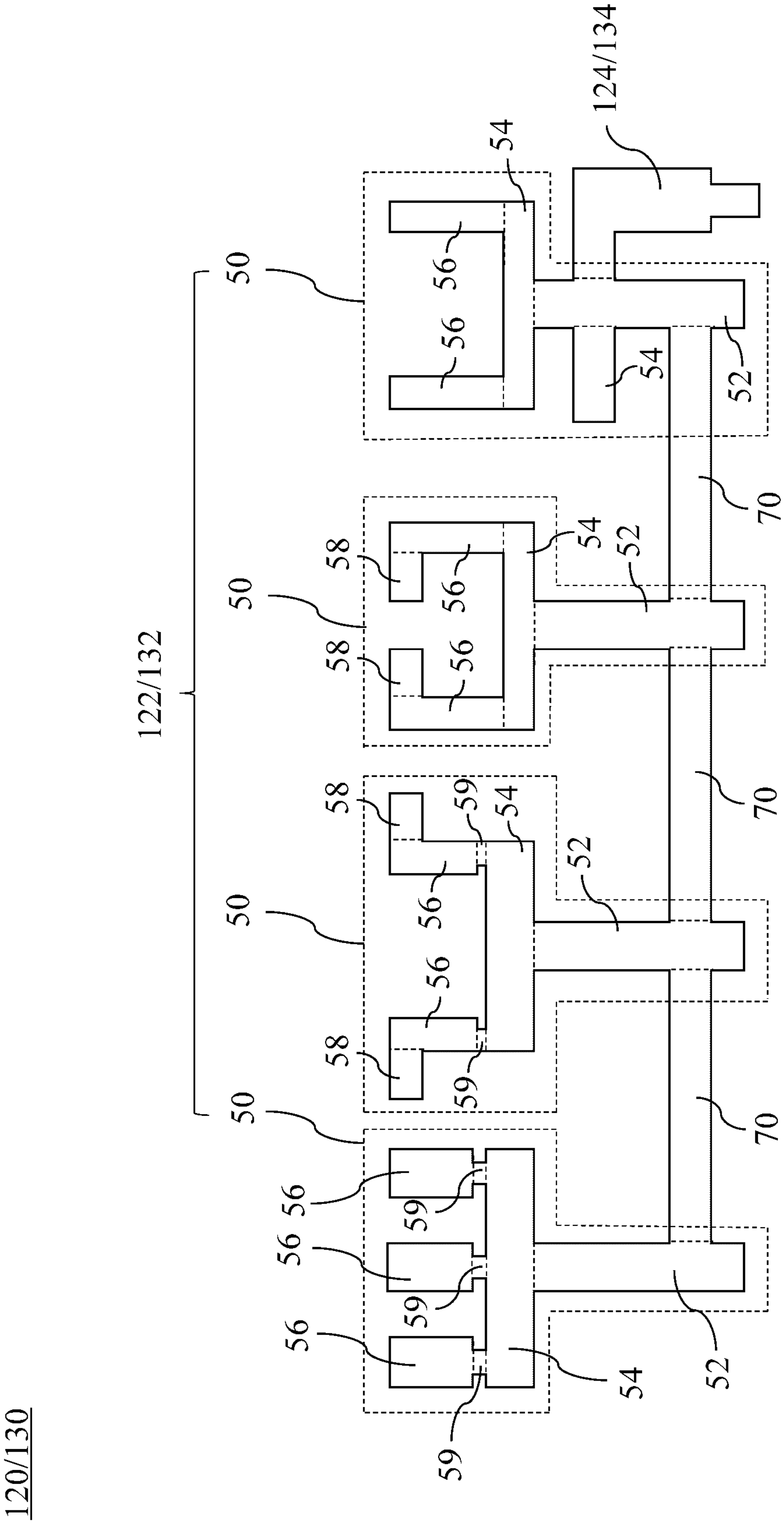
FIG. 4 is a top view of an embodiment of the input resonator/output resonator of FIG. 1.

Please refer to FIG. 1 to FIG. 4. FIG. 4 is a top view of an embodiment of the input resonator/output resonator of FIG. 1. In this embodiment, the input resonator 120 is located in the accommodating cavity 116 and fixed in the housing 110, and includes an input resonant body 122 and an input port 124 extending from the input resonant body 122. The input port 124 extends out of the housing 110 through the input hole 112. The output resonator 130 is located in the accommodating cavity 116 and fixed in the housing 110, and includes an output resonant body 132 and an output port 134 extending from the output resonant body 132. The output port 134 extends out of the housing 110 through the output hole 114. Therefore, the resonant filter 100 can extend out of the housing 110 by the input port 124 of the input resonator 120 passing through the input hole 112 and the output port 134 of the output resonator 130 passing through the output hole 114, to realize the simple structure of the input port 124 and the output port 134 of the resonant filter 100. When the input hole 112 and the output hole 114 are disposed on the bottom of the housing 110, the input port 124 and the output port 134 can be directly mounted on an external circuit board for patch welding or soldering.

In addition, the input resonator 120 and the output resonator 130 are sheets with a metal surface or metal sheets, so that the resonator filter 100 can realize capacitive coupling without a physical capacitive structure, thereby realizing the low-end transmission zero point. When the input resonator 120 and the output resonator 130 are metal sheets, they can be made by directly cutting the metal plates. When the input resonator 120 and the output resonator 130 are sheets with a metal surface, they can be made by electroplating after injection molding of plastic materials. The thickness of the input resonator 120 and the output resonator 130 may be, but is not limited to, 0.5 mm to 1 mm.

Besides, the input resonant body 122 and the output resonant body 132 respectively include a resonant rod 50. The resonant rod 50 includes an upright segment 52, an extension segment 54 extending from one or both sides of the upright segment 52, and a first branch 56 extending from the extension segment 54 away from the upright segment 52, and an end of the upright segment 52 away from the extending segment 54 is connected to the bottom of the housing 110. In an embodiment, the upright segment 52 of one of the resonant rods 50 of the input resonator 120 further extends to form the input port 124, and the upright segment 52 of one of the resonant rods 50 of the output resonator 130 further extends to form the output port 134. In an embodiment, the number of the first branches 56 is plural, and the plurality of first branches 56 are spaced apart from each other and connected to the extension segment 54.

Figure 5:
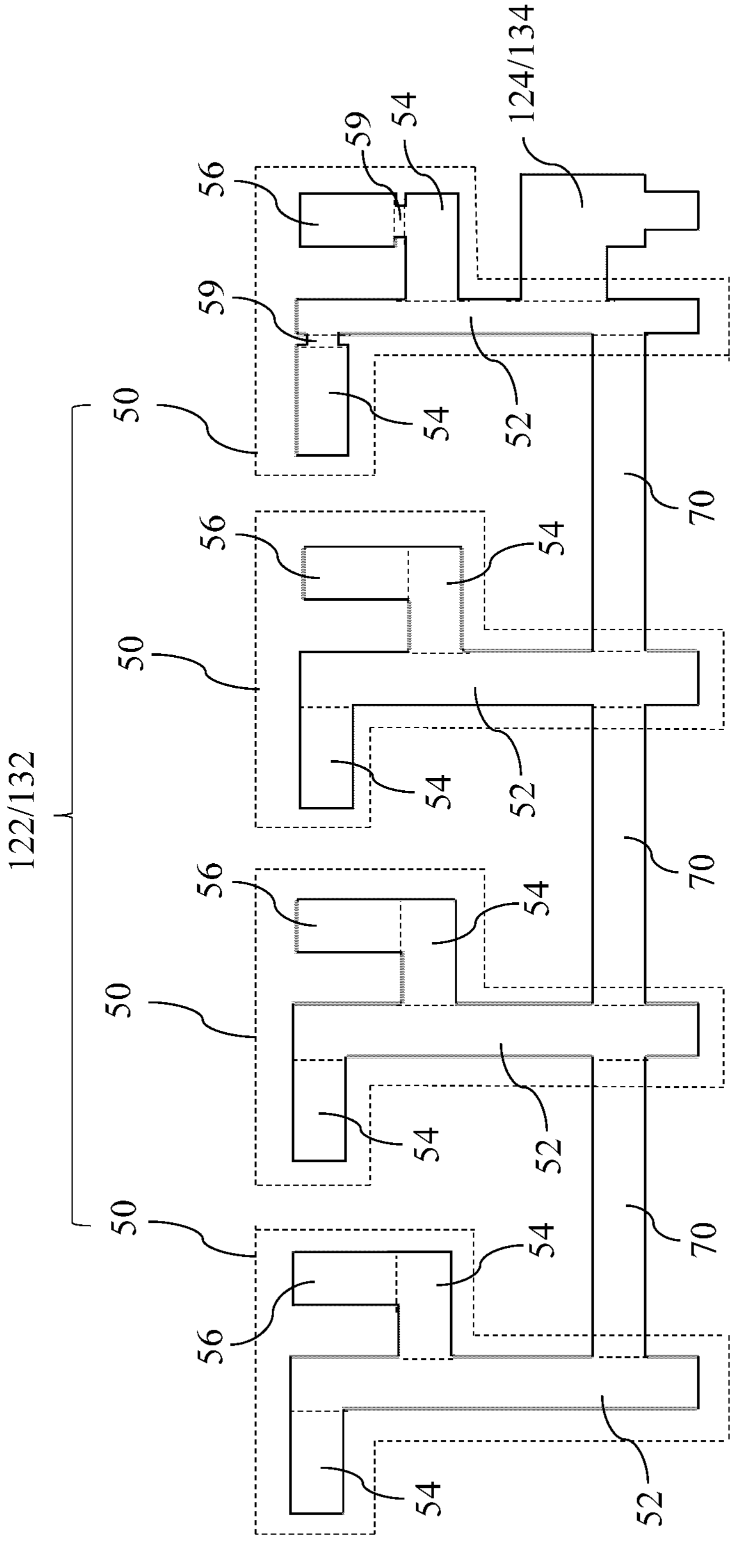
FIG. 5 is a top view of the input resonator/output resonator according to an embodiment of the present application.

In this embodiment, the resonant rod 50 can adjust the resonant frequency by different extension segments 54 and first branches 56. Therefore, the different extension segments 54 and first branches 56 can be designed according to actual needs to obtain different resonant frequencies. For example, in addition to the structure shown in FIG. 4, the input resonator 120 and the output resonator 130 may also have the structure shown in FIG. 5, wherein FIG. 5 is a top view of the input resonator/output resonator according to an embodiment of the present application.

In an embodiment, the resonance rod 50 further comprises a plurality of second branches 58, which respectively extend from ends of the first branches 56 away from the extension segment 54, and the first branches 56 and the second branches 58 extend along different axial directions. The plurality of second branches 58 may extend in the same direction, in directions towards each other, or in directions away from each other (as shown in FIGS. 4 and 5). In one embodiment, the first branch 56 and the second branch 58 are perpendicular to each other (as shown in FIG. 4). In an embodiment, the extension segments 54 extending from both sides of the upright segment 52 may be at the same height. For example, the extension segments 54 extending from both sides of the upright segment 52 are connected to form a line (as shown in FIG. 4). In an embodiment, the extension segments 54 extending from both sides of the upright segment 52 may be at different heights. For example, the extension segments 54 extending from both sides of the upright segment 52 form a zigzag shape (as shown in FIG. 5). Therefore, the resonant rod 50 can obtain different resonant frequencies by different designs (for example, number or position settings) of the second branches 58.

In an embodiment, the resonance rod 50 further comprises a coupling segment 59 connected between the first branch 56 and the extension segment 54, and a width of the coupling segment 59 is less than that of the first branch 56 connected to the coupling segment 59. Therefore, the resonance rod 50 can change the impedance between the first branch 56 and the extension segment 54 by the design of the coupling segment 59 to form a low-pass filter-like structure, which can effectively suppress remote harmonics.

In this embodiment, the input resonator 120 and the output resonator 130 may have the same structure, but this embodiment is not intended to limit the present application. That is, the input resonator 120 and the output resonator 130 may have different structures. In addition, since the input resonator 120 and the output resonator 130 are sheets with a metal surface or metal sheets, the structure of the input resonant body 122 and/or the output resonant body 132 can be changed by toggling the extension segment 54, the first branch 56 and/or the second branch 58 (that is, the distance between two local points on the resonant rod 50 and/or the distance between the resonant rod 50 and the housing 110 are adjusted) to obtain different resonant frequencies.

In an embodiment, the number of the resonant rods 50 of the input resonant body 122 and the number of the resonant rods 50 of the output resonant body 132 are respectively plural, and the input resonant body 122 and the output resonant body 132 respectively include an engaging rod 70 which is connected to adjacent two of the plurality of resonance rods 50. The resonant rods 50 may have the same structure or different structures. In the input resonant body 122 and the output resonant body 132, the resonant rod 50 and the engaging rod 70 may be integrally formed. In this embodiment, the number of resonant rods 50 included in the input resonant body 122 may be, but not limited to four, and the number of resonant rods 50 included in the output resonant body 132 may be, but not limited to four, but this embodiment is not intended to limit the present application.

Figure 6:
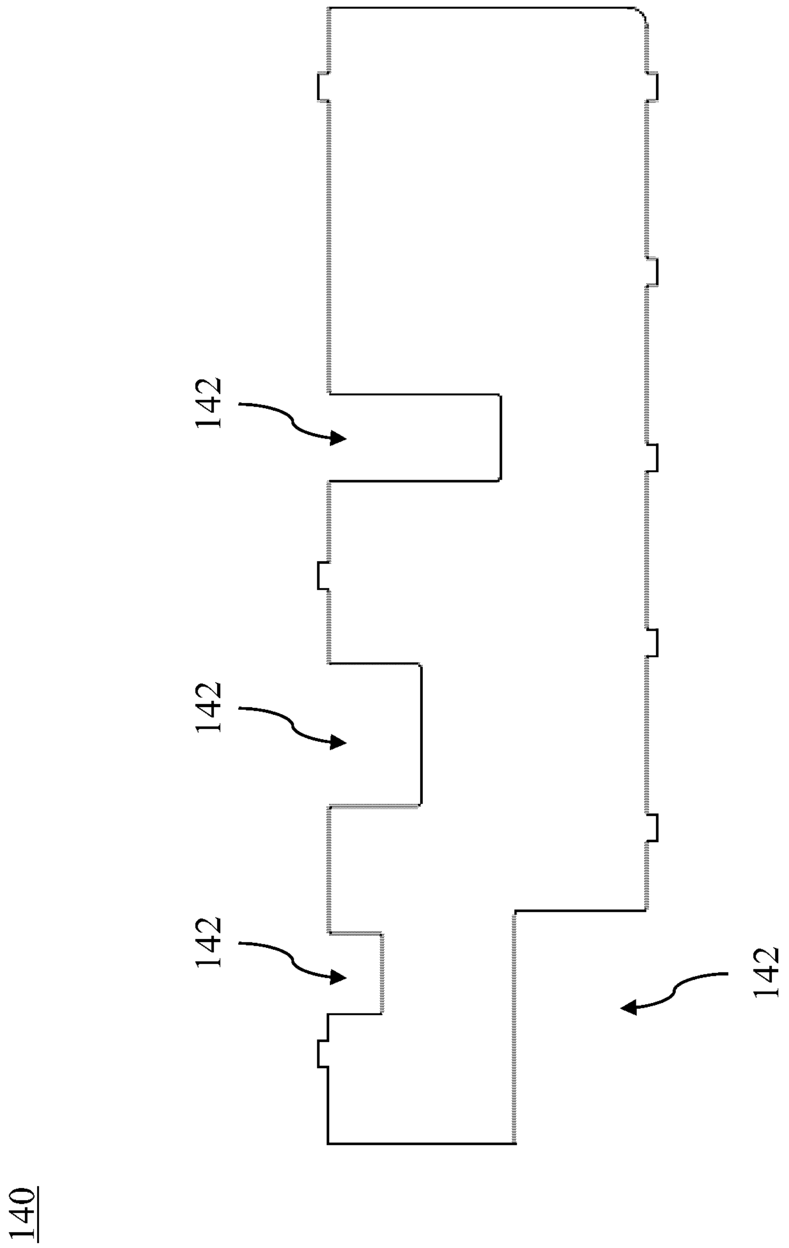
FIG. 6 is a top view of an embodiment of the isolation plate of FIG. 1.

Please refer to FIG. 1, FIG. 2 and FIG. 6. FIG. 6 is a top view of an embodiment of the isolation plate of FIG. 1. The resonant filter 100 further comprises an isolation plate 140, which is located in the accommodating cavity 116 and separates the input resonator 120 from the output resonator 130, and the isolation plate 140 has at least one opening 142. Therefore, the resonant filter 100 can obtain different resonant frequencies by the isolation plate 140 and the number and the setting position of the opening 142 thereof. The isolation plate 140 can be made by directly cutting the metal plate.

Please refer to FIG. 1 and FIG. 3. The resonant filter 100 further comprises an input device 150 and an output device 160. The input device 150 and the output device 160 are respectively engaged with the input hole 112 and the output hole 114 of the housing 110. The input port 124 passes through the input device 150 and extends out of the housing 110, and the output port 134 passes through the output device 160 and extends out of the housing 110. The input device 150 and the output device 160 may be insulating holders, and can be mechanically or adhesively joined to the input hole 112 and the output hole 114 of the housing 110.

Please refer to FIG. 1. The housing 110 further comprises a bottom plate portion 117, a side wall portion 118, and a cover plate portion 119. The side wall portion 118 is surroundingly connected to the bottom plate portion 117, and the side wall portion 118 and the bottom plate portion 117 form the accommodating cavity 116 and an opening. 60. One side surface of the cover portion 119 covers and is fixed on the opening 60. The input resonant body 122 and the output resonant body 132 are fixedly disposed on the bottom plate portion 117, and the input hole 112 and the output hole 114 are provided on the bottom plate portion 117 or the side wall portion 118. The bottom plate portion 117 and the side wall portion 118 can be integrally formed. That is, the bottom plate portion 117 and the side wall portion 118 can be directly formed by sheet metal bending or drawing molds, by electroplating after die-casting aluminum alloy or magnesium alloy, or by electroplating after plastic injection molding, to achieve the advantages of low cost and light weight.

Figure 7:
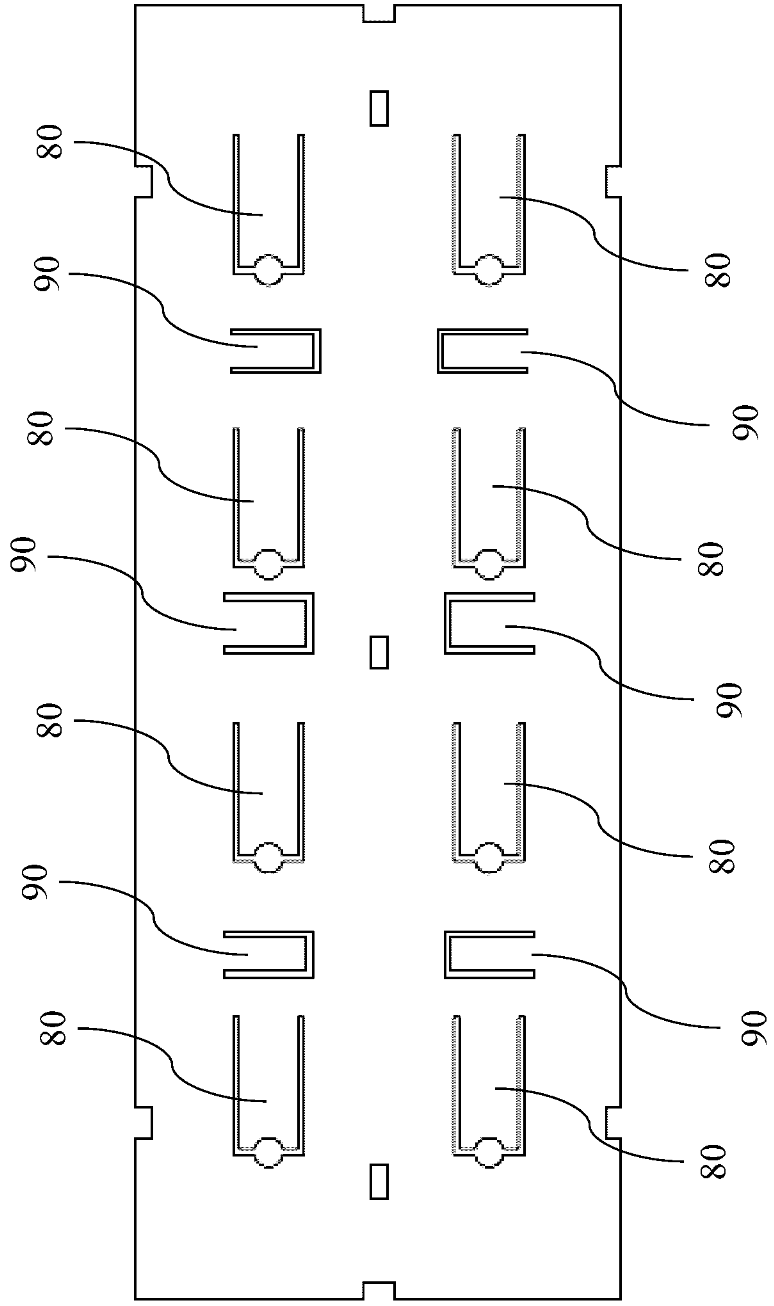
FIG. 7 is a top view of an embodiment of the cover plate portion of FIG. 1.

Please refer to FIG. 1 and FIG. 7. FIG. 7 is a top view of an embodiment of the cover plate portion of FIG. 1. The cover plate portion 119 can be made by directly processing a plate. The bottom plate portion 117 and the cover plate portion 119 are disposed parallel to each other. The input resonance body 122 and the output resonance body 132 are fixed on the bottom plate portion 117. The cover plate portion 119 is provided with an adjusting tab 80 and an isolation tab 90. The setting position of the adjustment tab 80 corresponds to the upper side of the input resonance body 122 or the upper side of the output resonance body 132, and the setting position of the isolation tab 90 corresponds to the upper side between two adjacent resonance rods 50 of the input resonance body 122 or the upper side between two adjacent resonant rods 50 of the output resonant body 132. Therefore, the resonant filter 100 can press or knock the adjustment tab 80 and/or the isolation tab 90 to deform the partial depression of the cover plate portion 119, thereby adjusting the resonance frequency and/or the coupling frequency. The numbers of adjustment tabs 80 and isolation tabs 90 are not necessarily positively correlated with the numbers of input resonance bodies 122 or output resonance bodies 132, and the numbers of adjustment tabs 80 and isolation tabs 90 can be adjusted according to actual requirements.

In summary, the embodiments of the present disclosure provide the resonator filter, which uses the input port of the input resonator to extend out of the housing through the input hole and uses the output port of the output resonator to extend out of the housing through the output hole, to realize the simple structure of the input port and the output port of the resonator filter. By the design of the input resonator and the output resonator as sheets with a metal surface or metal sheets, the resonant filter can realize capacitive coupling without a physical capacitive structure, thereby realizing the low-end transmission zero point. By the overall structural design, the resonance filter is small, the structure of the resonance filter is simple, and it is easy to realize the miniaturization process of the resonant filter, and it is conductive to the automated production of the resonant filter.

It is to be understood that the term "comprises", "comprising", or any other variants thereof, is intended to encompass a non-exclusive inclusion, such that a process, method, article, or device of a series of elements not only comprise those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A resonant filter, comprising:

a housing including an input hole, an output hole, and an accommodating cavity provided in the housing;

an input resonator located in the accommodating cavity and fixed in the housing, and including an input resonant body and an input port extending from the input resonant body and extending out of the housing through the input hole; and an output resonator located in the accommodating cavity and fixed in the housing, and including an output resonant body and an output port extending from the output resonant body and extending out of the housing through the output hole;

wherein the input resonator and the output resonator are sheets with a metal surface or metal sheets, the input resonator body and the output resonator body respectively include a resonant rod, and the resonant rod includes an upright segment, an extension segment extending from one or both sides of the upright segment, and a first branch extending from the extension segment away from the upright segment, and an end of the upright segment away from the extension segment is connected to the housing;

wherein the housing further comprises a bottom plate portion, a side wall portion, and a cover plate portion, the side wall portion is surroundingly connected to the bottom plate portion, the side wall portion and the bottom plate portion form the accommodating cavity and an opening, one side surface of the cover plate portion covers and is fixed on the opening, the input resonant body and the output resonant body are fixed on the bottom plate portion, and the input hole and the output hole are provided on the bottom plate portion or the side wall portion.

2. The resonant filter according to claim 1, further comprising an isolation plate, wherein the isolation plate is located in the accommodating cavity and separates the input resonator from the output resonator, and the isolation plate has at least one opening.

3. The resonant filter according to claim 1, further comprising an input device and an output device, wherein the input device and the output device are respectively engaged with the input hole and the output hole of the housing, the input port passes through the input device and extends out of the housing, and the output port passes through the output and extends out of the housing.

4. The resonant filter according to claim 1, wherein the number of the first branches is plural, and the first branches are spaced apart from each other and connected to the extension segment.

5. The resonant filter according to claim 4, wherein the resonant rod further comprises a plurality of second branches, the second branches respectively extend from ends of the first branches away from the extension segment, and the first branches and the second branches extend along different axial directions.

6. The resonant filter according to claim 5, wherein the second branches extend in the same direction, in directions towards each other, or in directions away from each other.

7. The resonant filter according to claim 5, further comprising an isolation plate, wherein the isolation plate is located in the accommodating cavity and separates the input resonator from the output resonator, and the isolation plate has at least one opening.

8. The resonant filter according to claim 7, further comprising an input device and an output device, wherein the input device and the output device are respectively engaged with the input hole and the output hole of the housing, the input port passes through the input device and extends out of the housing, and the output port passes through the output and extends out of the housing.

9. The resonant filter according to claim 7, wherein the housing further comprises a bottom plate portion, a side wall portion, and a cover plate portion, the side wall portion is surroundingly connected to the bottom plate portion, the side wall portion and the bottom plate portion form the accommodating cavity and an opening, one side surface of the cover plate portion covers and is fixed on the opening, the input resonant body and the output resonant body are fixed on the bottom plate portion, and the input hole and the output hole are provided on the bottom plate portion or the side wall portion.

10. The resonant filter according to claim 9, wherein the resonant rod further comprises a coupling segment connected between the first branch and the extension segment, and a width of the coupling segment is less than that of the first branch connected to the coupling segment.

11. The resonant filter according to claim 9, wherein the number of the resonant rods of the input resonant body and the number of the resonant rods of the output resonant body are respectively plural, and the input resonant body and the output resonant body further respectively comprise an engaging rod, and the engaging rod connects adjacent two of the resonant rods.

12. The resonant filter according to claim 11, wherein the bottom plate portion and the cover plate portion are disposed parallel to each other, the cover plate portion is provided with an adjusting tab and an isolation tab, a setting position of the adjusting tab corresponds to the upper side of the input resonant body or the upper side of the output resonant body, and a setting position of the isolation tab corresponds to the upper side between adjacent two of the resonant rods of the input resonant body or the upper side between adjacent two of the resonant rods of the output resonant body.

13. The resonant filter according to claim 1, wherein the number of the resonant rods of the input resonant body and the number of the resonant rods of the output resonant body are respectively plural, and the input resonant body and the output resonant body further respectively comprise an engaging rod, and the engaging rod connects adjacent two of the resonant rods.

14. The resonant filter according to claim 13, wherein the housing further comprises a bottom plate portion and a cover plate portion, the bottom plate portion and the cover plate portion are disposed parallel to each other, the input resonant body and the output resonant body are fixed on the bottom plate portion, the cover plate portion is provided with an adjusting tab and an isolation tab, a setting position of the adjusting tab corresponds to the upper side of the input resonant body or the upper side of the output resonant body, and a setting position of the isolation tab corresponds to the upper side between adjacent two of the resonant rods of the input resonant body or the upper side between adjacent two of the resonant rods of the output resonant body.

15. A resonant filter, comprising:

a housing including an input hole, an output hole, and an accommodating cavity provided in the housing;

an input resonator located in the accommodating cavity and fixed in the housing, and including an input resonant body and an input port extending from the input resonant body and extending out of the housing through the input hole; and an output resonator located in the accommodating cavity and fixed in the housing, and including an output resonant body and an output port extending from the output resonant body and extending out of the housing through the output hole;

wherein the input resonator and the output resonator are sheets with a metal surface or metal sheets, the input resonator body and the output resonator body respectively include a resonant rod, and the resonant rod includes an upright segment, an extension segment extending from one or both sides of the upright segment, and a first branch extending from the extension segment away from the upright segment, and an end of the upright segment away from the extension segment is connected to the housing;

wherein the resonant rod further comprises a coupling segment connected between the first branch and the extension segment, and a width of the coupling segment is less than that of the first branch connected to the coupling segment.

16. A resonant filter, comprising:

a housing including an input hole, an output hole, and an accommodating cavity provided in the housing;

an input resonator located in the accommodating cavity and fixed in the housing, and including an input resonant body and an input port extending from the input resonant body and extending out of the housing through the input hole; and an output resonator located in the accommodating cavity and fixed in the housing, and including an output resonant body and an output port extending from the output resonant body and extending out of the housing through the output hole;

wherein the input resonator and the output resonator are sheets with a metal surface or metal sheets, the input resonator body and the output resonator body respectively include a resonant rod, and the resonant rod includes an upright segment, an extension segment extending from one or both sides of the upright segment, and a first branch extending from the extension segment away from the upright segment, and an end of the upright segment away from the extension segment is connected to the housing;

wherein the number of the first branches is plural, and the first branches are spaced apart from each other and connected to the extension segment;

wherein the resonant rod further comprises a plurality of second branches, the second branches respectively extend from ends of the first branches away from the extension segment, and the first branches and the second branches extend along different axial directions.

17. The resonant filter according to claim 16, wherein the second branches extend in the same direction, in directions towards each other, or in directions away from each other.

18. The resonant filter according to claim 16, further comprising an isolation plate, wherein the isolation plate is located in the accommodating cavity and separates the input resonator from the output resonator, and the isolation plate has at least one opening.

19. The resonant filter according to claim 18, further comprising an input device and an output device, wherein the input device and the output device are respectively engaged with the input hole and the output hole of the housing, the input port passes through the input device and extends out of the housing, and the output port passes through the output and extends out of the housing.

* * * * *